Oct. 20, 1970　　A. A. COLEMAN ET AL　　3,534,908
VARIABLE GEOMETRY NOZZLE
Filed Nov. 2, 1967　　3 Sheets-Sheet 1
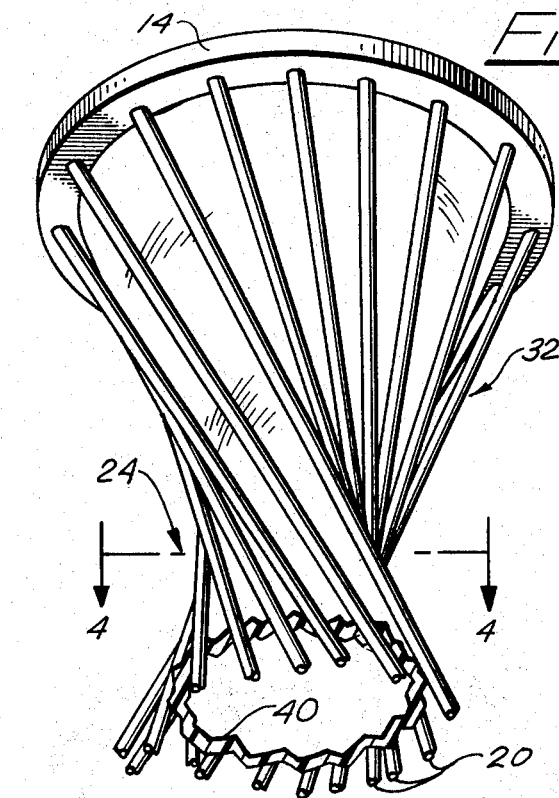
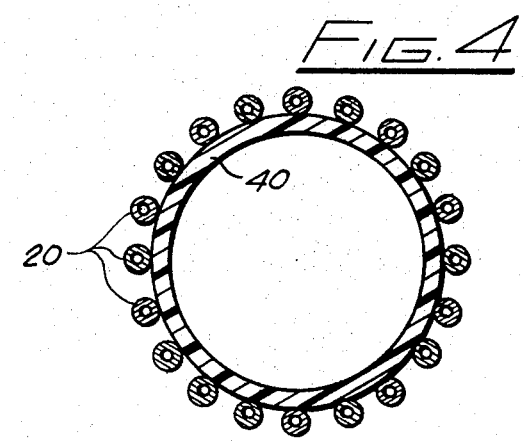
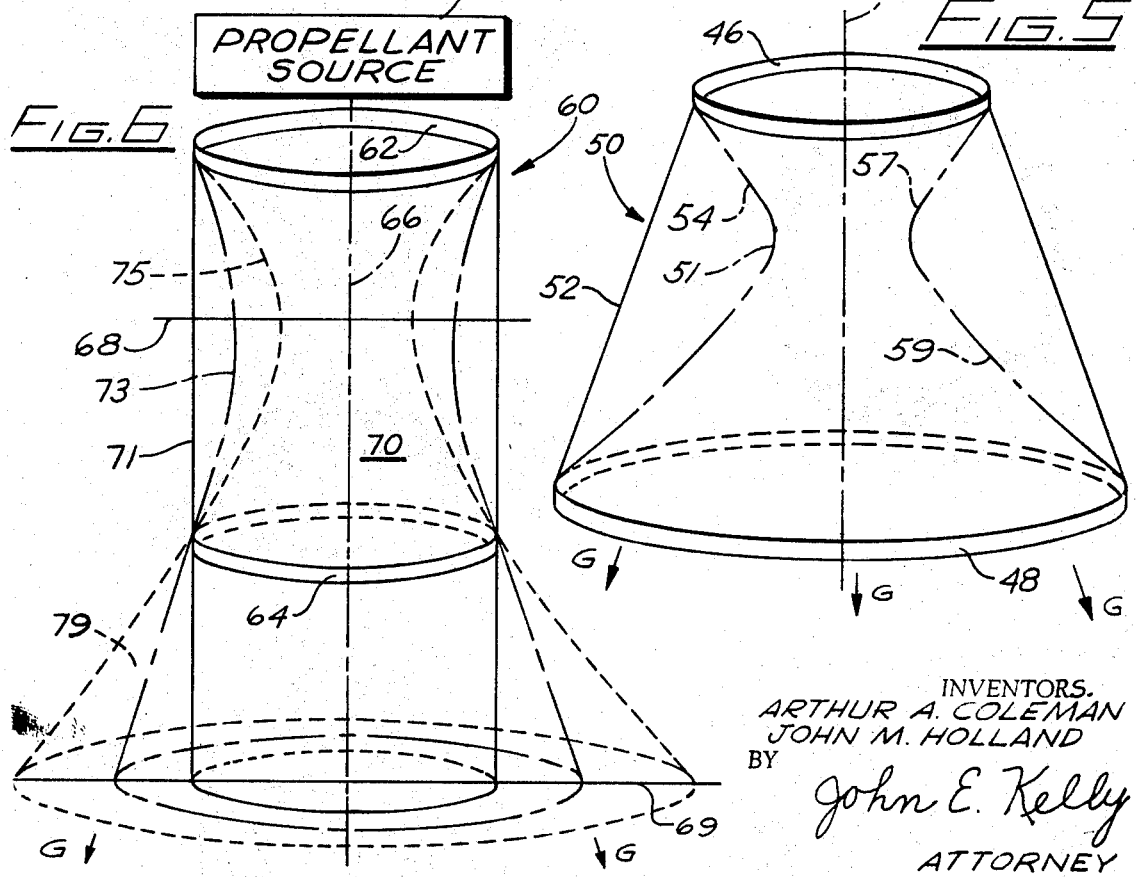
INVENTORS.
ARTHUR A. COLEMAN
JOHN M. HOLLAND
BY John E. Kelly
ATTORNEY

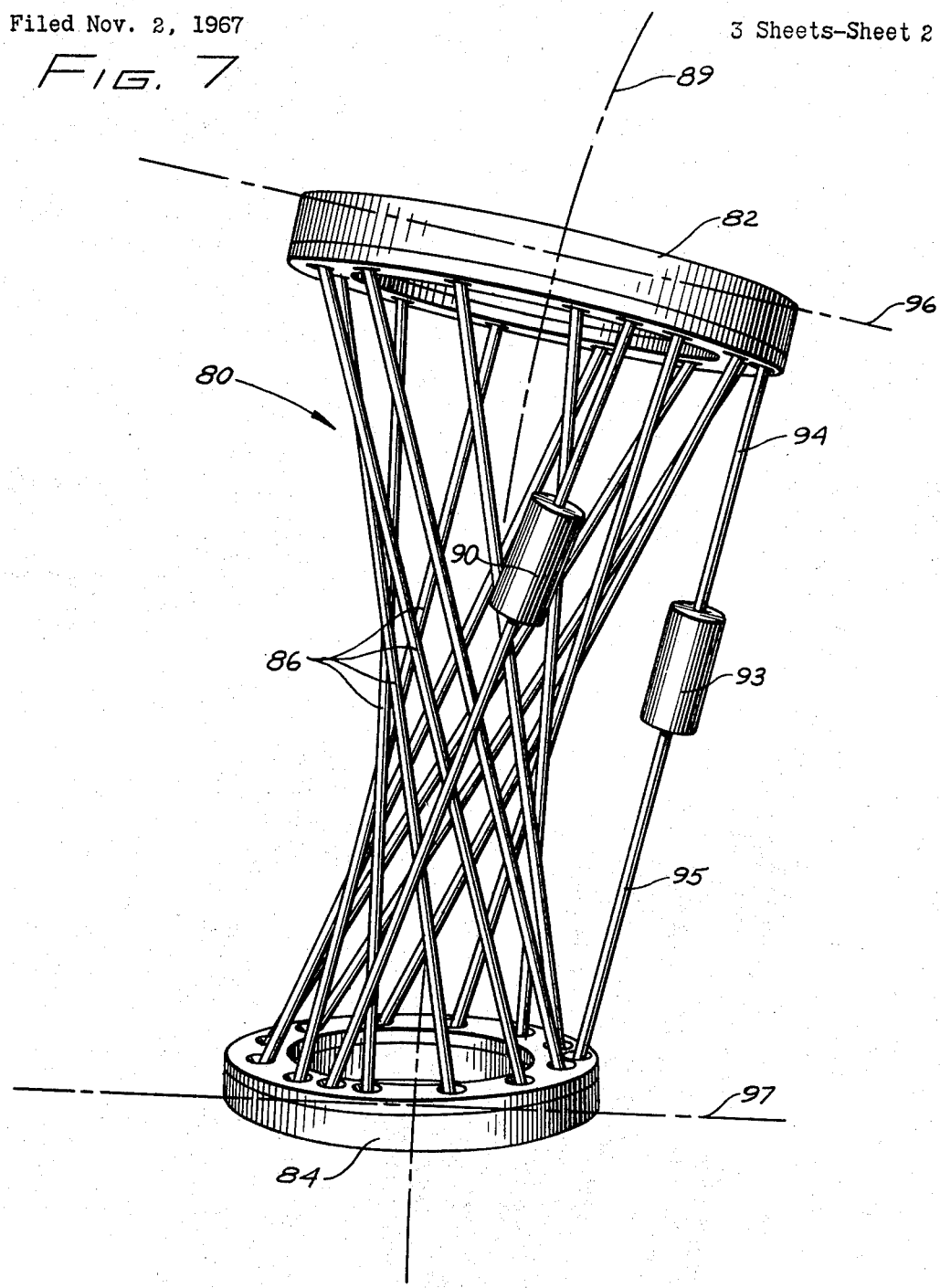

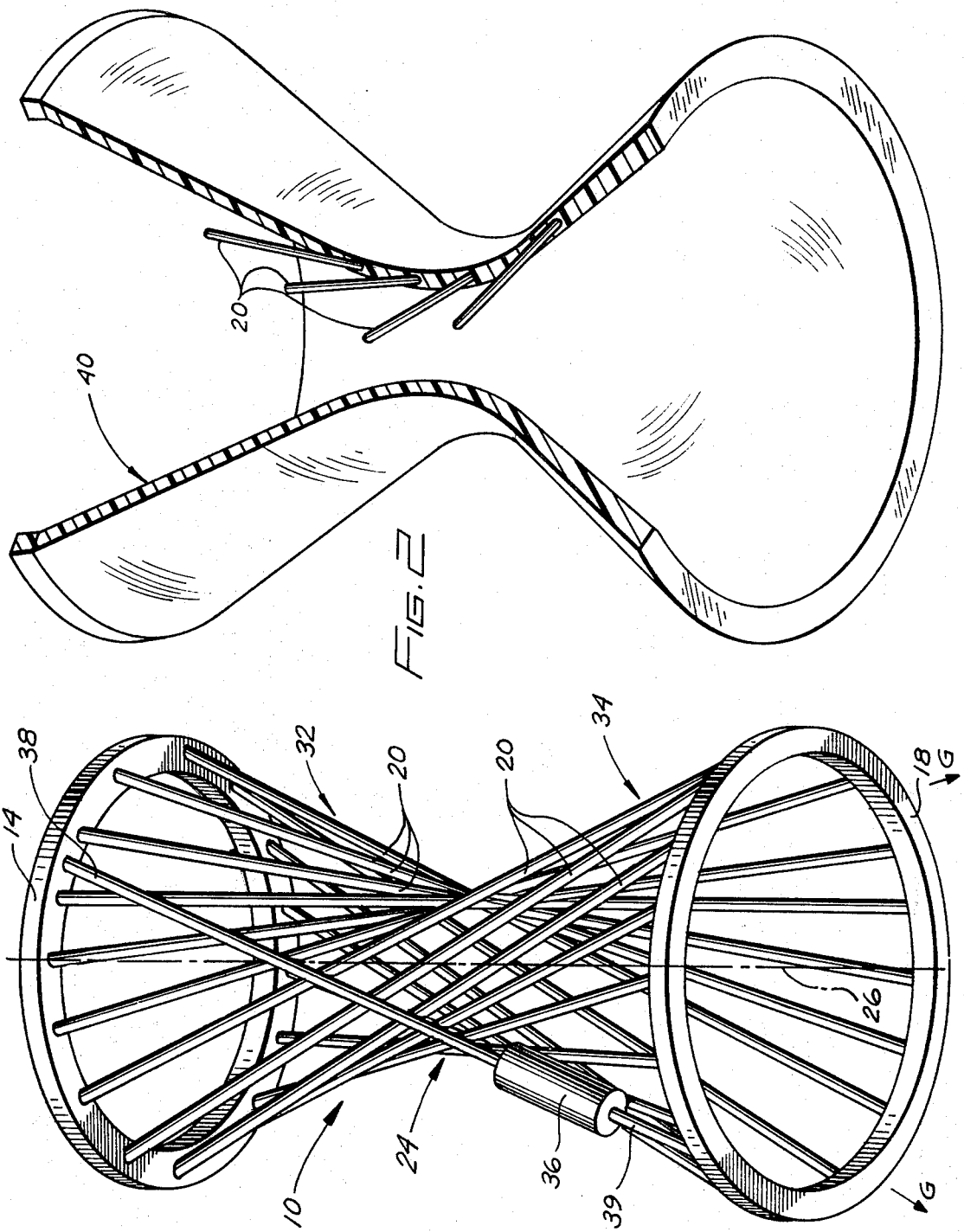

United States Patent Office 3,534,908
Patented Oct. 20, 1970

1

3,534,908
VARIABLE GEOMETRY NOZZLE
Arthur A. Coleman, Dallas, and John M. Holland, Waco, Tex., assignors to North American Rockwell Corporation
Filed Nov. 2, 1967, Ser. No. 680,152
Int. Cl. B64c *15/06*
U.S. Cl. 239—265.43                10 Claims

ABSTRACT OF THE DISCLOSURE

A convergent-divergent type rocket motor nozzle whose throat area can be varied to regulate thrust. The ends of a plurality of equal length rods are attached to a pair of spaced and concentric rings. By rotating the rings relative to one another, the throat size is varied and the rods are caused to generate a nozzle of variable hyperboloid configuration.

Background of the invention

This invention relates to gas generating nozzles and more specifically to a convergent-divergent type nozzle whose throat portion can be varied to modulate basic thrust and whose expansion ratio can be varied to maximize efficiency of potentially available thrust.

Numerous rocket propulsion systems are known that use solid grain or liquid propellants to generate combustion product, the reactive force of which constitutes thrust for propelling the rocket.

Fundamental thrust is dictated by the summation of two factors: (I) The momentum thrust factor constituted by the combustion product mass flow rate multiplied by the velocity at which the combustion product is ejected from the nozzle exit and (II) The pressure thrust factor constituted by the product of the exit area of the nozzle and the difference between the pressure of the exiting combustion product and the ambient pressure surrounding the nozzle exit. While overall thrust can be significantly modified by changing the value of either thrust factor, the momentum thrust factor is by far the dominating thrust segment. It is known that the momentum thrust can be varied over a wide range by varying the dimensions of the throat, i.e., the section of a convergent-divergent expansion nozzle where the cross-sectional area is the smallest. The throat functions to increase the velocity of the combustion product being discharged from the combustion chamber to sonic velocity. As is well known, the combustion product traveling through the divergent section continues to accelerate and becomes more supersonic so that the velocity is maximum at the nozzle exit. The throat functions to achieve maximum thrust by converting the potential energy of the combustion product in the combustion chamber to high level kinetic energy as it is ejected from the nozzle exit.

The concept of varying the throat portion of a nozzle so as to modulate thrust is known in the art. As shall be more fully explained below, contracting the throat of a solid grain rocket results in an increased grain burning rate and mass flow rate to increase thrust. By way of contrast, the throat of a liquid propellant rocket must be enlarged accompanied with a simultaneous increase of propellant input into the propellant chamber in order to achieve an increased thrust.

Various approaches for modulating thrust by varying the throat area have been previously considered. For example, axially moveable pintles or plugs have been positioned in the nozzle subsonic zone (i.e., disposed primarily in the convergent section) or in the supersonic zone (i.e., disposed primarily in the divergent section). Positioning these plugs in the vicinity of the throat suffers

2 from the disadvantages of direct combustion product particle impingement upon the plugs with resulting erosion and energy loss and also high temperature and high stress or loading penalties. Other known approaches are characterized by ejecting secondary fluid into the throat, using mechanical protrusions that can be inserted into and withdrawn from the throat, and using combustion product deflectors. These approaches, while capable of satisfying specified requirements, are generally complex and limited to relatively narrow operative ranges. Another arrangement for varying the throat area, as evidenced by U.S. Pat. 3,244,199 to Hayes, is characterized by an annular cam inclined across the throat zone of a rocket nozzle so that the throat area can be varied by rotating the cam. Heavy and space consuming gearing is required for altering the throat area.

The pressure thrust factor is regulated by varying the size of the nozzle exit area. Under ideal maximum efficiency circumstances the pressure of the exiting combustion product should be equal to the ambient pressure. Since the ambient pressure decreases as the rocket moves on its trajectory from sea level to high altitude, it is desirable that the nozzle exit area be gradually enlarged during ascent. In the case of rockets characterized by throats of fixed rather than variable dimensions, it is useful to refer to the expansion ratio which is defined by the nozzle exit area divided by the fixed throat area. To achieve optimum thrust the expansion ratio should be increased as the rocket increases in altitude. As mentioned above, this is achieved by gradually enlarging the nozzle exit area at a rate so that the pressure of the combustion product being discharged remains equal to the diminishing ambient pressure. It should be noted that varying the nozzle exit area only serves to achieve maximum efficiency of the potentially available thrust and cannot modify the basic available thrust. By way of contrast, varying the throat, in fact, modulates thrust and can affect thrust output over a very broad range.

Numerous systems are known for achieving optimum thrust efficiency by varying the nozzle exit area, as evidenced by U.S. Pat. No. 3,237,402 to Steverding and U.S. Pat. 3,249,306 to Altseimer. These patents show, respectively, that nozzle exit area can be enlarged during the ascending phase of the rocket flight by ejecting successively larger diameter ring-shaped ramps and deploying an expandable or extensible flexible skirt.

Summary of the invention

Briefly described, this invention is a variable geometry nozzle for conducting combustion product, whose configuration can be changed to modify the flow characteristics such as thrust when the nozzle is used in conjunction with a rocket motor. The nozzle incorporates two spaced retaining members that may be coaxially aligned rings of equal or different diameters. A plurality of spaced support rods extend between the retaining rings with one set of rod ends connected to one ring and the other set of rod ends connected to the other ring. The structural frame of the nozzle constituted by the rings assembled with the rods forms a hyperboloid. By varying the nozzle configuration a throat area positioned between the rings is varied to change flow characteristics. The nozzle configuration is varied by relatively rotating the rings which, since they are interconnected by the rods, twist them and reorient their positions. The rods can be selectively adjusted to positions corresponding to the flow characteristics desired. Disposed adjacent and coextensive with the rods is a flexible casing constituting the flow passageway for the combustion product. The rods may be positioned adjacent the exterior surface of the casing or may be imbedded in the casing in order to force the casing to conform to the desired configuration. The rings are relatively rotated by a hydraulic actuator positioned between the rings and which is connected to the rings by a pair of piston rods. Movement of the piston rods, which are aligned skew to the nozzle axis, automatically forces the rings to relatively rotate. In order to prevent the casing from overheating, the rods may be hollow for conducting a cooling fluid.

In another embodiment of the invention, one of the retaining rings is positioned between the throat area of the nozzle and the exit end of the exit cone portion of the nozzle. By this arrangement, relative rotation of rings varies the throat size and exit area of the exit cone so that one area is always enlarged as the other is diminished and vice versa.

In another embodiment hydraulic actuator interconnects the retaining rings and is aligned substantially parallel to the nozzle center line. By canting the planes of the rings, thrust vector control can be achieved simultaneously with thrust modulation.

Brief description of the drawings

The unique aspects and advantages of the instant invention will be fully understood by studying the following detailed description in conjunction with the drawings in which:

FIG. 1 is a perspective side view of the structural frame of the nozzle, showing one configuration of the nozzle;

FIG. 2 is a perspective sectional view showing the structural frame of FIG. 1 embedded in a convering of flexible material;

FIG. 3 is a perspective sectional view showing the structural frame of FIG. 1 surrounding a nozzle wall positioned entirely inward of the frame;

FIG. 4 is a cross-sectional view taken along line 4—4 of FIG. 3, showing the rods of the frame as hollow for regenerative cooling purposes;

FIG. 5 is a schematic view of a nozzle having retaining rings of different diameter and showing two nozzle configurations that can be achieved by rotating the rings relative to one another.

FIG. 6 is a schematic view of a nozzle having two retaining rings of substantially equivalent diameter, the nozzle being shown in three of its configurations that can be achieved by rotating the rings relative to one another.

FIG. 7 is a perspective view of the structural frame for a nozzle which is twisted so that the inlet and exit planes are canted.

Description of the preferred embodiments

Referring now to one nozzle formed in accordance with this invention, FIG. 1 shows a structural frame 10 for a nozzle capable of being used in conjunction with a solid grain or liquid propellant rocket motor or other gas generating device. As will be explained in detail, frame 10 can be operated to vary the nozzle throat area and geometry for the purpose of modulating thrust.

Many missions often require that the propulsion system of a rocket motor be capable of generating variable thrust. Frequently, the optimum trajectory of a flight vehicle operating within the earth's atmosphere demands a variable thrust level matching the aerodynamic drag of the vehicle. In other situations it may be desirable to alter the thrust level immediately prior to a vehicle's launch time to account for changes in the payload or mission objective. Maneuvering vehicles particularly are in need of variable thrust level control in order to achieve a degree of effectiveness necessary for a successful mission. Rendezvous and docking a planetary vehicle, for example, will benefit by having variable thrust capability.

Frame 10 includes a pair of spaced retainer members such as rings 14 and 18 whose axes are coaligned. A plurality of spaced structural rods 20 are interposed between rings 14 and 18, the structural rings and rods making frame 10 forming a hyperboloid. One set of ends of rods 20 are circularly aligned with and connected to ring 14 while the other set of ends of rods 20 are circularly aligned and connected to rings 18. The rings are of substantially equal diameter so that when rotated relative to one another (e.g., by rotating ring 14 relative to ring 18 or vice versa or by simultaneously rotating the rings in opposite directions), the rods 20 become, at least in part, displaced from their original positions and collectively serve to generate a surface of different configuration. One position (not shown) may be characterized by aligned rods 20 parallel with one another. If, in this situation, the rings are rotated or twisted relative to one another, then the positions of rods 20 are adjusted from being parallel with one another to positions where they are inclined relative to one another as shown. When this twisting action occurs, rods 20 generate a hyperboloid configuration and converge at a point intermediate their extreme ends to define a throat 24. Increasing the rotation will further restrict the diameter and cross-sectional area of throat 24 while reverse rotation will enlarge the diameter and cross-section area of throat 24. It can now be seen that by merely relatively rotating the rings, throat 24 can be caused to assume a desired geometry which can be made to correspond with a desired level of throat.

As previously indicated, the overall geometry of nozzle 10 is analogous to a hyperboloid. Describing the configuration of nozzle 10, from this standpoint, nozzle axis 26 would be the conjugate axis and the vertices of the hyperboloid would be the locus of points on the hyperboloid defining throat 24. Rods 20 would be generators, i.e., lines moveable over the range of positions which combine to define a surface.

The section of frame 10 between throat 24 and ring 14 is the convergent section or inlet cone 32 and the portion of frame 10 between throat 24 and ring 18 is the divergent section or exit cone 34, the gases G being discharged from divergent section 34 in a direction indicated by the arrows.

The relative rotation or twisting action between retaining members 14 and 18 may be achieved by a hydraulic actuator 36 which is schematically shown in exaggerated size. A piston rod 38 and another piston rod 39 are connected by hydraulic actuator 34. The rods are oriented skew relative to nozzle axis 26. The outer ends of rods 38 and 39 are suitably connected preferably by ball bearings, to retaining members 14 and 18, respectively. By simultaneously extending rods 38 and 39, assuming that retaining member 14 is fixed to a non-moveable section of rocket motor, e.g., a thrust chamber, extension of rods 38 and 39 automatically cause rotation of retaining member 18 to narrow throat area 24. Conversely, simultaneous retraction of rods 38 and 39 serve to enlarge throat area 24. Hydraulic actuator 36 may be operated by any conventional mechanism (not shown) such as a pressurized line controlled from a remote location, heat response, gas bleed-off, electrical pulse, explosive charge, timing device, etc. It should be noted that while retaining members 14 and 18 are shown as ring-shaped, they could also be rectangularly or elliptically shaped or the like to satisfy varying design requirements. While structural rods 20 have been illustrated as circular in cross section, they could also be rectangular, oval, elliptical, T-shaped, angle-shaped or the like. The rods 20 may also be hollow for conducting fluid to cool a nozzle casing as is explained in conjunction with FIG. 4. Materials such as steel, steel alloy, titanium, or a suitable composite material could be used in making the rods.

As illustrated in FIG. 2, structural rods 20 may be embedded in the material from which the nozzle sheath or covering 40 is constructed. Preferably the material of covering 40 is a flexible ablative capable of resisting high rates of shock and heating and penalties resulting from oxidation and erosion. For example, the covering material may be an elastomer characterized by low thermal conductivity, ability to transfer loads with minimum residual stress, ease of processing and fabrication, and excellent adhesion properties. A suitable elastomer would be an ethylene propylene terpolymer (EPT) with a suitable material. Another usable casing material would be reinforcing steel wire mesh or graphite cloth impregnated with a commercially available siloxane of the general formula poly (lower alkyl) siloxane or poly (lower alkyl-lower alkenyl) siloxanes. Representative of typical siloxanes are poly (dimethyl) siloxane and poly (methyl vinyl) siloxane.

An alternative mode for combining structural or generating rods 20 and the retaining members with covering 40 is illustrated in FIG. 3. In this embodiment of a variable geometry nozzle formed in accordance with the invention, the structural rods 20 generate a surface that surrounds and remains wholly external of covering 40. The material from which covering 40 is constructed may be the same as that described in connection with FIG. 2.

A cross-sectional view of the nozzle shown in FIG. 3 is shown in FIG. 4. The rods are hollow for conducting fluid to cool casing 40.

In another embodiment of the invention schematically depicted in FIG. 5, one retaining ring 46 is of smaller diameter than the other retaining ring 48. The axes of rings 46 and 48 are coaxial and coincide with axis 49 of rocket motor nozzle 50. By relatively rotating rings 46 and 48, the geometry of nozzle 50 may be varied between a position represented by a solid line 52 and a moved position represented by broken line 54. When the covering is in the position represented by solid line 52, the rods (not shown) diverge or flare from ring 46 to ring 48 and do not generate any nozzle throat. However, when the rings are rotated so that the rods generate a covering configuration represented by broken line 54 a throat 51 is shaped. It should be noted that unlike the nozzle described in conjunction with FIG. 1, the throat is not positioned half-way between the rings. Due to the fact that the diameter of ring 48 is larger than that of line 46, throat 51 will be closer to ring 46. The relative distance of throat 51 from the rings can be easily regulated by altering the diameters of the rings. The portion of the nozzle 50 between throat 51 and rings 46 is the convergent section or inlet cone 57 while the portion of nozzle 50 between throat 51 and ring 48 is the divergent section or exist cont 59. The combustion product gases G issue from exit cone 59 in the direction indicated by the arrows. It will be appreciated that the inlet cone 57 may be made larger than the exit cone 59 by designing ring 46 with a larger diameter than that of ring 48. If desired, a solid non-flexible skirt could be attached to ring 48.

In another embodiment of the variable nozzle configuration referring to FIG. 6, there is schematically illustrated a rocket motor nozzle 60 having a nozzle axis 66, a nozzle throat plane 68 and an exit plane 69. Connected to a propellant source 61 is a retainer ring 62 which is aligned coaxially with nozzle axis 66 and the axis of another retainer ring 64. By twisting the rings 62 and 64 relative to one another the configuration of the covering 70 may be varied. For purposes of illustration, the range of positions of covering 70 are represented by solid line 71, broken line 73, and dash line 75. The end-to-end length of covering 70 is larger than the distance between the rings so that a portion 79 of covering 70 extends downstream of ring 64 terminating at exit plane 69. The portion of covering 70 extending between ring 64 and exit plane 69 will be referred to as skirt 79.

When nozzle 60 is varied from covering configuration 71 to 73, it can be seen that the area of throat 68 contracts while exit area 69 simultaneously becomes enlarged. Conversely when the configuration of covering 70 is varied from line 75 to line 73 throat area 68 becomes enlarged while exit area 69 is diminished. Increasing the throat area automatically decreases the exit area and vice versa. As have previously been explained, when a rocket motor ascends from an earth-based launching site, it is desirable in order to maximize thrust efficiency to vary the exit area so that the pressure of the combustion product being ejected is substantially equivalent to the pressure of ambient space. Since pressure becomes more rarefied with increasing altitude, it is customary to enlarge the exit area during ascent. Customarily, as the rocket increases in altitude, there is a concomitant increase in the expansion ratio, i.e., the ratio expressed as nozzle exit area divided by throat area. For a rocket of known capabilities programmed to achieve a desired performance, the ideal rate of change in the expansion ratio can be calculated. In accordance with this invention, the rate of change of the expansion ratio can be efficiently and rapidly attained because as the exit area is expanded with increasing altitude, the throat area is simultaneously contracted. As contrasted with this inventive arrangement, in the case of conventional rocket motors the throat area is of fixed dimensions and therefore only the exit area can be altered to change the expansion ratio. Referring again to FIG. 6, since both throat area 68 and exit area 69 vary simultaneously and cooperate to achieve the desired configuration, less movement is required of the exit area 69.

When the propellant source 61, being used with rocket nozzle 60 is of solid grain type, increased thrust can be automatically achieved by narrowing the throat area 68. Rather than merely maximizing the potentially available thrust (this is what is typically accomplished by varying only the exit area), varying the throat area modifies the basic thrust output. A phenomenon peculiar to the combustion in a solid grain rocket motor is that the grain burning rate is increased by narrowing the throat. This results in a greater rate of combustion product mass discharge and therefore increased thrust results.

In the case of a liquid rocket motor, thrust is increased by increasing rather than decreasing the throat area. Simultaneously the propellant mass input being injected into the combustion chamber must also be increased. Otherwise the pressure differential across the injector face would become substantially changed with result that combustion would become erratic and unpredictable. A variable flow-rate turbo pump would be required to regulate flow to the combustion chamber as the throat is varied.

Thus, it can be seen that the nozzle embodiment shown in FIG. 6 can be operated to throttle or modulate basic thrust output and also can be used to maximize the potentially available thrust.

FIG. 7 illustrates a structural frame 80 for another nozzle formed in accordance with this invention. The nozzle differs from the previously described nozzles in that thrust modulation, i.e., thrust increase or decrease, and thrust vector control can be achieved simultaneously. Nozzle frame 80 has a retaining ring 82 interconnected with another retaining ring 84 by way of a plurality of intermediate structural rods 86. The ends of rods 86 are connected to rings 82 and 84 by way of omnidirectional joints (not shown) such as ball bearing joints that permit the rod ends to freely rotate in all directions. Rods 86 are illustrated as being of equal length, although they could be of different lengths. Hydraulic actuator 90 which is aligned skew to nozzle center line 89 operates to accomplish relative rotation of retainer rings 82 and 84 in a manner as has been described in conjunction with FIG. 1. An additional hydraulic actuator 93 having piston rods 94 and 95 is aligned substantially parallel with the nozzle longitudinal center line 92. When actuator 90 has been operated to achieve the desired throat size, then actuator 93 may be operated to incline the planes of retainer rings 82 and 84 relative to one another. This action achieves canting inlet plane 96 relative to exit plane 97. It can now be seen that when the nozzle is being used to conduct combustion product that actuator 90 may be used to modulate thrust while actuator 93 may be used to dictate the thrust vectoring. The configuration illustrated in FIG. 7 is achieved when the piston rods 94 and 95 are retracted into actuator 93. To achieve a configuration where inlet plane 96 and exit plane 97 are canted in the opposite direction, then piston rods 94 and 95 would be expanded rather than retracted. Additional actuators such as actuator 93 could be installed to achieve canting in selected directions. This nozzle arrangement may also be used as an air intake duct for a high-speed airplane to efficiently guide inflowing air when the airplane in experiencing changes in its angle of attack.

We claim:

1. A variable geometry nozzle for conducting combustion product, the nozzle comprising:
   a first retaining member,
   a second retaining member spaced from the first retaining member,
   a plurality of spaced support twist rods extending longitudinally between and connected to the retaining members,
   a discrete flexible imperforate casing disposed adjacent the rods constituting an internal passageway for the combustion product, and
   means for relatively rotating the retaining members to selectively skew the positions of the rods to thereby vary the configuration of the nozzle and said internal passageway.

2. The structure according to claim 1 wherein the rods are spaced outside the exterior surface of the casing.

3. The structure according to claim 1 wherein the rods are embedded in the casing.

4. The structure according to claim 1 wherein the rods are hollow for conducting fluid to cool the casing.

5. The structure according to claim 1 wherein a throat area is constituted by the narrowest cross section of the nozzle between the retaining members,
   an inlet cone for combustion product is constituted by the portion of the nozzle between the throat and one of the retaining members, and
   an exit cone is constituted by the portion of the nozzle between the throat and the other retaining member.

6. The structure according to claim 1 wherein the relatively rotating retaining members are rings having different diameters.

7. A variable geometry nozzle for conducting combustion product, the nozzle comprising:
   a first retaining member,
   a second retaining member spaced from the first retaining member,
   a plurality of support rods extending between and connected to the retaining members,
   a flexible casing disposed adjacent the rods constituting a passageway for the combustion product, and
   means for relatively rotating the retaining members to selectively adjust the positions of the rods to thereby vary the configuration of the nozzle wherein the means for relatively rotating the retaining members is characterized by
      a hydraulic actuator positioned between the retaining members,
      a first piston rod connected to the actuator and the first retaining member,
      a second piston rod connected to the actuator and the second retaining member,
      wherein the two piston rods are aligned skew to the nozzle axis so that relative rotation can be accomplished when the hydraulic actuator moves the piston rods.

8. A variable geometry nozzle comprising:
   a first retaining member,
   a second retaining member spaced from the first retaining member, a plurality of support rods extending between and connected to the retaining members,
   a flexible casing disposed adjacent the rods constituting a passageway,
   first actuator means for relatively rotating the retaining members to selectively adjust the positions of the rods to thereby vary the configuration of the nozzle, and
   second actuator means interconnecting the retaining members for mutually canting the planes of the retaining members.

9. The structure according to claim 8 wherein,
   the first actuator means is a hydraulic actuator connected to the retaining members by a pair of piston rods aligned skew to the center line of the nozzle, and
   the second actuator means is a hydraulic actuator connected to the retaining members by a pair of piston rods that are aligned substantially parallel to the center line of the nozzle.

10. In a nozzle having an inlet cone and an exit cone joined together at a throat zone, the improvement comprising:
   the nozzle comprising a flexible casing,
   means for simultaneously varying the size of the throat area and exit area of the exit cone formed by said casing so that when the throat area is enlarged the exit area is diminished and vice versa wherein the means for varying the throat and exit areas is characterized by
   a first retaining member disposed adjacent the inlet end of the inlet cone
   a second retaining member disposed between the throat area and the exit end of the exit cone
   interconnecting means characterized by a plurality of spaced structural rods extending between the first retaining member and the exit end of the exit cone for interconnecting the retaining members and
   actuator means connected to at least one of said retaining members for relatively rotating the retaining members to vary the nozzle configuration.

References Cited

UNITED STATES PATENTS

| | | | |
|---|---|---|---|
| 2,569,996 | 10/1951 | Kollsman | 239—265.43 |
| 2,603,062 | 7/1952 | Weiler et al. | 239—265.43 |
| 2,880,577 | 4/1959 | Halford et al. | 239—127.1 |
| 2,935,841 | 5/1960 | Myers et al. | 239—127.1 |
| 3,174,688 | 3/1965 | Chatten | 239—20 |
| 3,229,457 | 1/1966 | Rowe et al. | 239—265.37 |
| 3,237,402 | 3/1966 | Steverding | 239—75 |
| 3,244,199 | 4/1966 | Hayes | 239—265.33 |

FOREIGN PATENTS 593,849  3/1960  Canada.

EVERETT W. KIRBY, Primary Examiner

U.S. Cl. X.R.

60—271, 266, 264; 74—89; 239—265.37, 265.19